US011148649B2

(12) United States Patent
Owada (10) Patent No.: US 11,148,649 B2
(45) Date of Patent: Oct. 19, 2021

(54) MASTER CYLINDER (71) Applicant: Hitachi Automotive Systems, Ltd., Hitachinaka (JP)

(72) Inventor: Hiroshi Owada, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 15 days.

(21) Appl. No.: 16/319,489

(22) PCT Filed: Aug. 17, 2017

(86) PCT No.: PCT/JP2017/029512
§ 371 (c)(1),
(2) Date: Jan. 22, 2019

(87) PCT Pub. No.: WO2018/066238
PCT Pub. Date: Apr. 12, 2018

(65) Prior Publication Data
US 2020/0139951 A1 May 7, 2020

(30) Foreign Application Priority Data
Oct. 4, 2016 (JP) .............................. JP2016-196655

(51) Int. Cl.
*B60T 11/236* (2006.01)
*F16J 15/3204* (2016.01)
*F16J 15/3236* (2016.01)

(52) U.S. Cl.
CPC ......... *B60T 11/236* (2013.01); *F16J 15/3204* (2013.01); *F16J 15/3236* (2013.01)

(58) Field of Classification Search
CPC .... F16J 15/3204; F16J 15/3236; B60T 11/236
See application file for complete search history.

(56) References Cited

U.S. PATENT DOCUMENTS 4,417,503 A * 11/1983 Izumi ................... F16J 15/3204
277/436
4,553,761 A * 11/1985 Blesing ................. F16J 15/164
277/553

(Continued)

FOREIGN PATENT DOCUMENTS

| CN | 1781787 A | 6/2006 |
|---|---|---|
| CN | 1906434 A | 1/2007 |

(Continued)

OTHER PUBLICATIONS

International Search Report of PCT/JP2017/029512 dated Nov. 7, 2017.

(Continued)

*Primary Examiner* — Eugene G Byrd
(74) *Attorney, Agent, or Firm* — Mattingly & Malur, P.C.

(57) ABSTRACT

A master cylinder includes a seal defining a feeding channel and an exterior of a cylinder main body having an inner circumferential lip portion which protrudes from a toric base portion and comes into sliding contact with an outer circumferential surface of a piston, and an outer circumferential lip portion which abuts a circumferential groove of the cylinder main body. The inner circumferential lip portion has a length in a piston axis direction longer than the outer circumferential lip portion. The circumferential groove has an inclined surface portion formed in a circumferential wall on the feeding channel side such that a groove width increases from a groove bottom portion toward a groove opening portion.

10 Claims, 6 Drawing Sheets

(56) References Cited

U.S. PATENT DOCUMENTS

| | | | |
|---|---|---|---|
| 6,000,220 A * | 12/1999 | Simon Bacardit | B60B 11/236 60/562 |
| 6,189,894 B1 * | 2/2001 | Wheeler | F16J 15/3236 277/549 |
| 7,934,378 B2 * | 5/2011 | Gaffe | B60T 11/232 60/588 |
| 7,937,940 B2 * | 5/2011 | Gaffe | B60T 11/236 60/588 |
| 10,351,114 B2 * | 7/2019 | Owada | F16J 15/164 |
| 2003/0010202 A1 * | 1/2003 | Norheim | F16J 15/3236 92/245 |
| 2006/0064978 A1 | 3/2006 | Mouri et al. | |
| 2006/0179836 A1 | 8/2006 | Ishikawa et al. | |
| 2007/0157613 A1 | 7/2007 | Chiba | |
| 2010/0071546 A1 * | 3/2010 | Hanaoka | B60T 11/236 92/165 R |
| 2011/0296827 A1 * | 12/2011 | Ruopp | B60T 11/236 60/585 |
| 2012/0096848 A1 | 4/2012 | Bernadat et al. | |
| 2014/0041221 A1 * | 2/2014 | Auguste | F15B 19/005 29/888.02 |
| 2015/0075370 A1 | 3/2015 | Murayama et al. | |
| 2015/0175142 A1 * | 6/2015 | Lopez-Larequi | B60T 11/28 60/533 |
| 2015/0246664 A1 * | 9/2015 | Tanabe | F16J 15/3236 60/586 |
| 2015/0353066 A1 * | 12/2015 | Konig | B60T 11/20 60/581 |

FOREIGN PATENT DOCUMENTS

| | | |
|---|---|---|
| JP | 2012-166728 A | 9/2012 |
| JP | 2012-530014 A | 11/2012 |
| JP | 2013-237370 A | 11/2013 |
| JP | 2015-193352 A | 11/2015 |
| JP | 2016-055734 A | 4/2016 |
| WO | 2004/094208 A1 | 11/2004 |
| WO | 2013/147246 A1 | 10/2013 |

OTHER PUBLICATIONS

Translation of Chinese Office Action received in corresponding Chinese Application No. 201780044451.7 dated Aug. 25, 2020.
Notice of Reasons for Rejection issued in corresponding Japanese Patent Application No. 2018-543765 dated May 26, 2020.

* cited by examiner

FIG. 6

MASTER CYLINDER

TECHNICAL FIELD

The present invention relates to a master cylinder supplying a hydraulic pressure to a braking cylinder of a vehicle.

Priority is claimed on Japanese Patent Application No. 2016-196655, filed Oct. 4, 2016, the content of which is incorporated herein by reference.

BACKGROUND ART

A master cylinder in which a cup seal is provided inside a circumferential groove of a cylinder main body has been proposed (for example, refer to Patent Literature 1).

CITATION LIST

Patent Literature

[Patent Literature 1]
Japanese Unexamined Patent Application, First Publication No. 2015-193352

SUMMARY OF INVENTION

Technical Problem

In master cylinders, improvement of seal efficiency is required.

The present invention provides a master cylinder of which the seal efficiency can be improved.

Solution to Problem

According to an aspect of the present invention, there is provided a master cylinder configured to include a seal defining a feeding channel and an exterior of a cylinder main body, the seal having an inner circumferential lip portion which protrudes from a toric base portion and comes into sliding contact with an outer circumferential surface of a piston and an outer circumferential lip portion which abuts a circumferential groove of the cylinder main body. The inner circumferential lip portion has a length in a piston axis direction longer than the outer circumferential lip portion. The circumferential groove has an inclined surface portion formed in a circumferential wall on the feeding channel side such that a groove width increases from a groove bottom portion toward a groove opening portion.

Advantageous Effects of Invention

According to the master cylinder described above, seal efficiency can be improved.

DESCRIPTION OF EMBODIMENT

Figure 1:
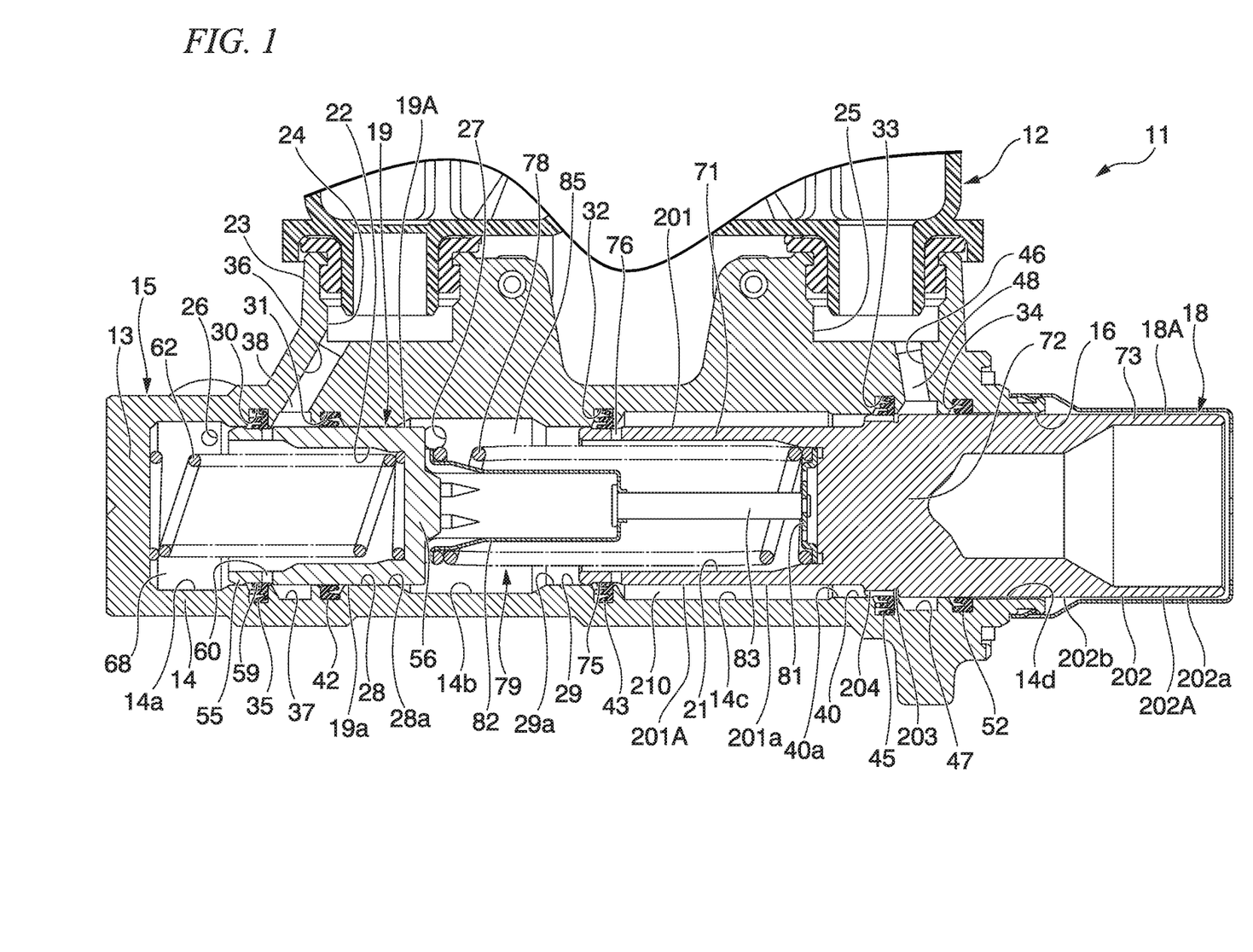
FIG. 1 is a cross-sectional view illustrating a master cylinder of an embodiment.

An embodiment according to the present invention will be described with reference to the drawings. In a master cylinder 11 of the present embodiment illustrated in FIG. 1, a force corresponding to an operation amount of a brake pedal (not illustrated) is introduced via an output shaft of a brake booster (not illustrated) and generates a braking hydraulic pressure corresponding to the operation amount of the brake pedal. A reservoir 12 (FIG. 1 illustrates only a part thereof) supplying and discharging a brake fluid upward in a vertical direction is attached to this master cylinder 11. In the present embodiment, the reservoir 12 is directly attached to the master cylinder 11. However, a reservoir may be disposed at a position away from the master cylinder 11, and the reservoir and the master cylinder 11 may be connected to each other through a piping.

The master cylinder 11 has a metal cylinder main body 15 which is formed of one material and is subjected to machining into a bottomed cylinder shape having a bottom portion 13 and a cylinder portion 14. A metal primary piston 18 (piston) is movably provided on an opening portion 16 side inside this cylinder main body 15 in a manner of partially protruding from the cylinder main body 15. Similarly, a metal secondary piston 19 is movably provided on a side closer to the bottom portion 13 side than the primary piston 18 inside the cylinder main body 15. An inner circumferential hole 21 having a bottom surface is formed in the primary piston 18. An inner circumferential hole 22 having a bottom surface is formed in the secondary piston 19. The master cylinder 11 is of a so-called plunger type. In addition, the master cylinder 11 is a tandem-type master cylinder having two pistons, which are the primary piston 18 and the secondary piston 19 as described above. The present invention is not limited to being applied to a tandem-type master cylinder. The present invention may also be applied to any master cylinder, such as a single-type master cylinder in which one piston is provided in a cylinder main body, and a master cylinder having three or more pistons.

In the cylinder main body 15, an attachment base portion 23 protruding outward in a radial direction of the cylinder portion 14 thereof (which will hereinafter be referred to as a cylinder radial direction) is integrally formed at a predetermined position in a circumferential direction of the cylinder portion 14 thereof (which will hereinafter be referred to as a cylinder circumferential direction). In this attachment base portion 23, an attachment hole 24 and an attachment hole 25 for attaching the reservoir 12 are formed. In the present embodiment, the attachment hole 24 and the attachment hole 25 are formed in an upper portion in the vertical direction such that their positions are shifted in a central axis direction of the cylinder portion 14 of the cylinder main body 15 (which will hereinafter be referred to as a cylinder axis) in a state in which their positions in the cylinder circumferential direction coincide with each other. The cylinder main body 15 is disposed in a vehicle in a posture in which the cylinder axis direction lies along a front-rear direction of the vehicle.

On the attachment base portion 23 side of the cylinder portion 14 of the cylinder main body 15, a secondary discharging channel 26 is formed in the vicinity of the bottom portion 13. In addition, a primary discharging channel 27 is formed on a side closer to the opening portion 16 of the cylinder main body 15 than the secondary discharging channel 26 of the cylinder portion 14 of the cylinder main body 15. The secondary discharging channel 26 and the primary discharging channel 27 communicate with a braking cylinder (not illustrated), such as a disk brake or a drum brake, via a brake piping and discharge the brake fluid toward the braking cylinder.

In an inner circumferential portion of the cylinder portion 14 of the cylinder main body 15 on the bottom portion 13 side, a bottom side sliding inner diameter portion 28 protruding inward in the cylinder radial direction beyond a cylindrical inner circumferential surface 14a of an end portion of the cylinder portion 14 on the bottom portion 13 side and having an annular shape in the cylinder circumferential direction is formed. The bottom side sliding inner diameter portion 28 protrudes inward in the cylinder radial direction beyond a cylindrical inner circumferential surface 14b adjacent to the opening portion 16 side. Accordingly, a minimum inner diameter surface 28a of the bottom side sliding inner diameter portion 28 has a smaller diameter than the inner circumferential surfaces 14a and 14b. The secondary piston 19 is fitted to be slidable on the minimum inner diameter surface 28a of this bottom side sliding inner diameter portion 28. The secondary piston 19 is guided by this minimum inner diameter surface 28a and moves in the cylinder axis direction. The inner circumferential surface 14b of the cylinder portion 14 has a slightly larger diameter than the inner circumferential surface 14a.

In the inner circumferential portion of the cylinder portion 14 of the cylinder main body 15 on a side closer to the opening portion 16 than the bottom side sliding inner diameter portion 28, an intermediate sliding inner diameter portion 29 protruding inward in the cylinder radial direction beyond the inner circumferential surface 14b and having an annular shape in the cylinder circumferential direction is formed. The intermediate sliding inner diameter portion 29 protrudes inward in the cylinder radial direction beyond a cylindrical inner circumferential surface 14c adjacent to the opening portion 16 side. Accordingly, a minimum inner diameter surface 29a of the intermediate sliding inner diameter portion 29 has a smaller diameter than the inner circumferential surfaces 14b and 14c. The minimum inner diameter surface 29a of the intermediate sliding inner diameter portion 29 has the same diameter as the minimum inner diameter surface 28a. The inner circumferential surface 14c of the cylinder portion 14 has a larger diameter than the inner circumferential surface 14b.

In the inner circumferential portion of the cylinder portion 14 of the cylinder main body 15 on a side closer to the opening portion 16 than the intermediate sliding inner diameter portion 29, an opening side sliding inner diameter portion 40 protruding inward in the cylinder radial direction beyond the inner circumferential surface 14c and having an annular shape in the cylinder circumferential direction is formed. The opening side sliding inner diameter portion 40 also protrudes inward in the cylinder radial direction with respect to a cylindrical inner circumferential surface 14d adjacent to the opening portion 16 side. Accordingly, a minimum inner diameter surface 40a of the opening side sliding inner diameter portion 40 has a smaller diameter than the inner circumferential surfaces 14c and 14d. The minimum inner diameter surface 40a of the opening side sliding inner diameter portion 40 has a larger diameter than the minimum inner diameter surface 29a.

The primary piston 18 has a stepped shape. The primary piston 18 is fitted to be slidable on the minimum inner diameter surfaces 29a and 40a of the intermediate sliding inner diameter portion 29 and the opening side sliding inner diameter portion 40. The primary piston 18 is guided by these minimum inner diameter surfaces 29a and 40a and moves in the cylinder axis direction.

A plurality of circumferential grooves, specifically two, a circumferential groove 30 and a circumferential groove 31 both of which have a toric shape are formed in the bottom side sliding inner diameter portion 28 from the bottom portion 13 side in this order such that their positions are shifted in the cylinder axis direction. The circumferential grooves 30 and 31 are annularly formed in the cylinder circumferential direction and have a shape recessed outward in the cylinder radial direction beyond the minimum inner diameter surface 28a. One toric circumferential groove 32 is formed in the intermediate sliding inner diameter portion 29. The circumferential groove 32 is annularly formed in the cylinder circumferential direction and has a shape recessed outward in the cylinder radial direction beyond the minimum inner diameter surface 29a. A plurality of circumferential grooves, specifically two, a circumferential groove 33 and a circumferential groove 34 both of which have a toric shape are formed in the opening side sliding inner diameter portion 40 from the bottom portion 13 side in this order such that their positions are shifted in the cylinder axis direction. The circumferential groove 33 is annularly formed in the cylinder circumferential direction and has a shape recessed outward in the cylinder radial direction beyond the minimum inner diameter surface 40a. The circumferential groove 34 is formed at a boundary position between the minimum inner diameter surface 40a and the inner circumferential surface 14d, is annularly formed in the cylinder circumferential direction, and has a shape recessed outward in the cylinder radial direction beyond the minimum inner diameter surface 40a and the inner circumferential surface 14d. All of the circumferential grooves 30 to 34 are formed through cutting and are open on an inner circumferential surface of the cylinder main body 15.

The circumferential groove 30, of the circumferential grooves 30 to 34, closest to the bottom portion 13 side is formed in the vicinity of the attachment hole 24, of the attachment hole 24 and the attachment hole 25, on the bottom portion 13 side. A piston seal 35 with a toric check valve function is disposed inside this circumferential groove 30 in a manner of being held in the circumferential groove 30.

On a side closer to the opening portion 16 than the circumferential groove 30 in the bottom side sliding inner diameter portion 28 of the cylinder main body 15, an annular opening groove 37 recessed outward in the cylinder radial direction beyond the minimum inner diameter surface 28a is formed. This opening groove 37 causes a communication hole 36 drilled from the attachment hole 24 on the bottom portion 13 side to be open inside the cylinder portion 14. Here, the opening groove 37 and the communication hole 36 configure a secondary feeding channel 38 which is provided in the cylinder main body 15 and communicates with the reservoir 12 at all times.

In the bottom side sliding inner diameter portion 28 of the cylinder main body 15, the circumferential groove 31 is formed on a side opposite to the circumferential groove 30 of the opening groove 37 in the cylinder axis direction, that is, on a side closer to the opening portion 16. A piston seal 42 closed at all times with no toric check valve function is disposed inside this circumferential groove 31 in a manner of being held in the circumferential groove 31.

A piston seal 43 with a toric check valve function is disposed inside the circumferential groove 32 formed in the intermediate sliding inner diameter portion 29 of the cylinder main body 15, in a manner of being held in the circumferential groove 32.

In the opening side sliding inner diameter portion 40 of the cylinder main body 15, the circumferential groove 33 is formed in the vicinity of the attachment hole 25 on the opening portion 16 side. A piston seal 45 with a toric check valve function is disposed inside this circumferential groove 33 in a manner of being held in the circumferential groove 33.

On the opening portion 16 side of this circumferential groove 33 in the opening side sliding inner diameter portion 40 of the cylinder main body 15, an annular opening groove 47 recessed outward in the cylinder radial direction beyond the minimum inner diameter surface 40a is formed.

This opening groove 47 causes a communication hole 46 drilled from the attachment hole 25 on the opening portion 16 side to be open inside the cylinder portion 14. Here, the opening groove 47 and the communication hole 46 mainly configure a primary feeding channel (feeding channel) 48 which is provided in the cylinder main body 15 and communicates with the reservoir 12 at all times.

The circumferential groove 34 is formed on a side opposite to the circumferential groove 33 of the opening groove 47 in the opening side sliding inner diameter portion 40 of the cylinder main body 15, that is, in the opening portion 16. A seal 52 closed at all times with no toric check valve function is disposed inside this circumferential groove 34 in a manner of being held in the circumferential groove 34.

The secondary piston 19 disposed on the bottom portion 13 side of the cylinder main body 15 is formed into a bottomed cylindrical shape having a cylindrical portion 55 and a bottom portion 56 which is formed on one side of the cylindrical portion 55 in the axis direction. The inner circumferential hole 22 is formed by the cylindrical portion 55 and the bottom portion 56. The secondary piston 19 is fitted to be slidable in the inner circumference of each of the bottom side sliding inner diameter portion 28 of the cylinder main body 15, and the piston seal 35 and the piston seal 42 both of which are provided in the bottom side sliding inner diameter portion 28, in a state in which the cylindrical portion 55 is disposed on the bottom portion 13 side of the cylinder main body 15.

In a state of being fitted in this manner, the central axis of the secondary piston 19 coincides with the cylinder portion 14 of the cylinder main body 15.

In an outer circumferential portion on an end side opposite to the bottom portion 56 of the cylindrical portion 55, a toric recess portion 59 recessed inward in the radial direction beyond a maximum outer diameter surface 19a having the maximum diameter on an outer circumferential surface 19A of the secondary piston 19 is formed. A plurality of ports 60 penetrating this recess portion 59 in the cylinder radial direction to the bottom portion 56 side thereof are radially formed in the recess portion 59 in positions at equal intervals in the cylinder circumferential direction.

A secondary piston spring 62 is provided between the secondary piston 19 and the bottom portion 13 of the cylinder main body 15 determining the intervals thereof in a non-braking state having no input from the output shaft of the brake booster (not illustrated). In this secondary piston spring 62, one end abuts the bottom portion 13 of the cylinder main body 15 and the other end abuts the bottom portion 56 of the secondary piston 19.

Here, a part formed to be surrounded by the bottom portion 13 of the cylinder main body 15, the bottom portion 13 side of the cylinder portion 14, and the secondary piston 19 configures a secondary pressure chamber 68 which generates a braking hydraulic pressure and supplies the braking hydraulic pressure to the secondary discharging channel 26. In other words, the secondary piston 19 forms the secondary pressure chamber 68 supplying a hydraulic pressure to the secondary discharging channel 26 between the secondary piston 19 and the cylinder main body 15. The inner circumferential surface 14a of the cylinder portion 14 forms this secondary pressure chamber 68. When the secondary piston 19 causes the ports 60 to be positioned on a side closer to the opening groove 37 than the piston seal 35, this secondary pressure chamber 68 communicates with the secondary feeding channel 38, that is, the reservoir 12 via the ports 60.

The piston seal 42 held in the circumferential groove 31 of the cylinder main body 15 is an integrally molded article formed of synthetic rubber. The shape on one side in a cross section in the radial direction including the center line thereof forms a C-shape. The piston seal 42 is disposed while having its lip toward the opening portion 16 side. The inner circumference of the piston seal 42 comes into sliding contact with the outer circumferential surface 19A of the secondary piston 19 moving in the cylinder axis direction. In addition, the outer circumference of the piston seal 42 abuts the circumferential groove 31 of the cylinder main body 15. Accordingly, the piston seal 42 seals the gap between the secondary piston 19 and the piston seal 42 of the cylinder main body 15 occurred at the position of the piston seal 42 at all times.

The piston seal 35 held in the circumferential groove 30 of the cylinder main body 15 is an integrally molded article formed of synthetic rubber such as EPDM. The shape on one side in a cross section in the radial direction including the center line thereof forms an E-shape. The piston seal 35 is disposed while having its lip toward the bottom portion 13 side. The inner circumference of the piston seal 35 comes into sliding contact with the outer circumferential surface 19A of the secondary piston 19 moving in the cylinder axis direction. In addition, the outer circumference of the piston seal 35 abuts the circumferential groove 30 of the cylinder main body 15. In a state in which the secondary piston 19 causes the ports 60 to be positioned on a side closer to the bottom portion 13 than the piston seal 35, this piston seal 35 can seal a space between the secondary feeding channel 38 and the secondary pressure chamber 68. That is, the piston seal 35 can block communication of the secondary pressure chamber 68 with respect to the secondary feeding channel 38 and the reservoir 12. In this sealing state, when the secondary piston 19 slides in the inner circumference of the bottom side sliding inner diameter portion 28 of the cylinder main body 15 and the piston seals 35 and 42 and moves toward the bottom portion 13, the brake fluid inside the secondary pressure chamber 68 is pressurized. The brake fluid pressurized inside the secondary pressure chamber 68 is supplied from the secondary discharging channel 26 to the braking cylinder on the wheel side.

When there is no input from the output shaft of the brake booster (not illustrated), and the secondary piston 19 described above is at a basic position (non-braking position)

where the ports 60 are open in the opening groove 37 as illustrated in FIG. 1, the piston seal 35 is inside the recess portion 59 of the secondary piston 19 and a part thereof overlaps the ports 60 in the cylinder axis direction. Then, when the secondary piston 19 moves toward the bottom portion 13 of the cylinder main body 15, and the inner circumferential portion of the piston seal 35 entirely overlaps the ports 60, communication between the secondary pressure chamber 68 and the reservoir 12 is blocked.

The primary piston 18 disposed on a position closer to the opening portion 16 of the cylinder main body 15 is formed into a shape having a first cylindrical portion 71, a bottom portion 72, and a second cylindrical portion 73 in order from one end side in its central axis (which will hereinafter be referred to as a piston axis) direction. The inner circumferential hole 21 is formed by the first cylindrical portion 71 and the bottom portion 72. The primary piston 18 has a small outer diameter portion 201 of which the outer diameter side is formed from the first cylindrical portion 71 to an intermediate portion of the bottom portion 72, and a large outer diameter portion 202 which is formed from the intermediate portion of the bottom portion to the second cylindrical portion 73. The maximum outer diameter of the large outer diameter portion 202 is larger than the maximum outer diameter of the small outer diameter portion 201.

On the small outer diameter portion 201 side of the large outer diameter portion 202, an annular groove 203 having an toric shape recessed inward in the radial direction of the primary piston 18 (which will hereinafter be referred to as the piston radial direction) beyond a maximum outer diameter surface 202a having the maximum diameter in an outer circumferential surface 202A of the large outer diameter portion 202 is formed. In addition, on a side closer to the small outer diameter portion 201 of the large outer diameter portion 202 than the annular groove 203, axis-direction grooves 204 extending from the annular groove 203 and leading to the small outer diameter portion 201 are formed. A plurality of axis-direction grooves 204 are formed in the large outer diameter portion 202 at equal intervals in a circumferential direction of the primary piston 18 (which will hereinafter be referred to as a piston circumferential direction). A side of the large outer diameter portion 202 opposite to the small outer diameter portion 201 from the annular groove 203 is a cylinder surface 202b continuously formed throughout the entire circumference without a groove or a hole.

The primary piston 18 is fitted to be slidable in the inner circumference of each of the intermediate sliding inner diameter portion 29 of the cylinder main body 15, the piston seal 43 provided in the intermediate sliding inner diameter portion 29, the opening side sliding inner diameter portion 40, and the piston seal 45 and the seal 52 provided in the opening side sliding inner diameter portion 40, in a state in which the first cylindrical portion 71 is disposed on the secondary piston 19 side inside the cylinder main body 15. In this case, the small outer diameter portion 201 is fitted in the intermediate sliding inner diameter portion 29 and the piston seal 43, and the large outer diameter portion 202 is fitted in the opening side sliding inner diameter portion 40, the piston seal 45, and the seal 52. In a state of being fitted in this manner, the central axis of the primary piston 18 coincides with that of the cylinder portion 14 of the cylinder main body 15. Accordingly, the piston axis direction becomes the cylinder axis direction, the piston radial direction becomes the cylinder radial direction, and the piston circumferential direction becomes the cylinder circumferential direction. The output shaft of the brake booster (not illustrated) is inserted on the inner side of the second cylindrical portion 73, and the bottom portion 72 is pressed by this output shaft.

In an outer circumferential portion of the small outer diameter portion 201 on an end side opposite to the large outer diameter portion 202, a toric recess portion 75 recessed inward in the radial direction beyond a maximum outer diameter surface 201a having the maximum diameter on an outer circumferential surface 201A of the small outer diameter portion 201 is formed. A plurality of ports 76 penetrating this recess portion 75 in the piston radial direction to the large outer diameter portion 202 side thereof are radially formed in positions at equal intervals in the piston circumferential direction.

An interval adjustment portion 79 including a primary piston spring 78 determining the intervals between the secondary piston 19 and the primary piston 18 in a non-braking state having no input from the output shaft of the brake booster (not illustrated) is provided between the secondary piston 19 and the primary piston 18. This interval adjustment portion 79 has an interlock member 81 which abuts the bottom portion 72 of the primary piston 18, an interlock member 82 which abuts the bottom portion 56 of the secondary piston 19, and a shaft member 83 of which one end portion is fixed to the interlock member 81 and which slidably supports the interlock member 82 within only a predetermined range. The primary piston spring 78 is installed between the interlock member 81 and the interlock member 82.

Here, a part formed to be surrounded by the cylinder portion 14 of the cylinder main body 15, the primary piston 18, and the secondary piston 19 configures a primary pressure chamber 85 (pressure chamber) which generates a braking hydraulic pressure and supplies the brake fluid to the primary discharging channel 27. In other words, the primary piston 18 forms the primary pressure chamber 85 supplying a hydraulic pressure to the primary discharging channel 27 between the secondary piston 19 and the cylinder main body 15. The inner circumferential surface 14b of the cylinder portion 14 forms the primary pressure chamber 85.

In addition, a part formed to be surrounded between the intermediate sliding inner diameter portion 29 and the opening side sliding inner diameter portion 40 of the cylinder portion 14 of the cylinder main body 15 and by the primary piston 18 configures a large-diameter pressure chamber 210 (pressure chamber) which supplies a hydraulic pressure to the primary pressure chamber 85. In other words, the primary piston 18 forms the large-diameter pressure chamber 210 supplying the brake fluid to the primary discharging channel 27 via the primary pressure chamber 85 between the primary piston 18 and the cylinder main body 15. The inner circumferential surface 14c of the cylinder portion 14 forms the large-diameter pressure chamber 210. When the primary piston 18 causes the ports 76 to be positioned on a side closer to the opening portion 16 than the piston seal 43, the primary pressure chamber 85 communicates with the large-diameter pressure chamber 210 via the ports 76.

The piston seal 43 held in the circumferential groove 32 of the cylinder main body 15 is a component common to the piston seal 35 and is an integrally molded article formed of synthetic rubber such as EPDM. The shape on one side in a cross section in the radial direction including the center line thereof forms an E-shape. The piston seal 43 is disposed while having its lip toward the bottom portion 13 side. The inner circumference of the piston seal 43 comes into sliding contact with the outer circumferential surface 201A of the small outer diameter portion 201 of the primary piston 18 moving in the cylinder axis direction. The outer circumference of the piston seal 43 abuts the circumferential groove 32 of the cylinder main body 15. In a state in which the primary piston 18 causes the ports 76 to be positioned on a side closer to the bottom portion 13 than the piston seal 45, this piston seal 43 can seal a space between the large-diameter pressure chamber 210 and the primary pressure chamber 85. That is, the piston seal 43 can block communication between the primary pressure chamber 85 and the large-diameter pressure chamber 210. In this sealing state, when the primary piston 18 slides in the inner circumferences of the intermediate sliding inner diameter portion 29, the piston seal 43, the opening side sliding inner diameter portion 40, the piston seal 45, and the seal 52 and moves toward the bottom portion 13, the brake fluid inside the primary pressure chamber 85 is pressurized. The brake fluid pressurized inside the primary pressure chamber 85 is supplied from the primary discharging channel 27 to the braking cylinder on the wheel side.

When the primary piston 18 causes the annular groove 203 to be positioned on a side closer to the opening portion 16 than the piston seal 45, the large-diameter pressure chamber 210 communicates with the primary feeding channel 48, that is, the reservoir 12 via the annular groove 203 and the axis-direction grooves 204.

The seal 52 held in the circumferential groove 34 of the cylinder main body 15 is an integrally molded article formed of synthetic rubber. The shape on one side in a cross section in the radial direction including the center line thereof forms a C-shape. The seal 52 is disposed while having its lip toward the bottom portion 13 side. The inner circumference of the seal 52 comes into sliding contact with the cylinder surface 202b of the outer circumferential surface 202A of the large outer diameter portion 202 of the primary piston 18 moving in the cylinder axis direction. The outer circumference of the seal 52 abuts the circumferential groove 34 of the cylinder main body 15. Accordingly, the seal 52 seals the gap between the primary piston 18 and the seal 52 of the cylinder main body 15 at the position of the seal 52 at all times. As a result, the seal 52 seals a space between the primary feeding channel 48 and the atmosphere side at all times and defines the primary feeding channel 48 and the exterior of the cylinder main body 15.

The piston seal 45 held in the circumferential groove 33 of the cylinder main body 15 is an integrally molded article formed of synthetic rubber such as EPDM. The shape on one side in a cross section in the radial direction including the center line thereof forms an E-shape. The piston seal 45 is disposed while having its lip toward the bottom portion 13 side. The inner circumference of the piston seal 45 comes into sliding contact with the outer circumferential surface 202A of the large outer diameter portion 202 of the primary piston 18 moving in the cylinder axis direction. The outer circumference of the piston seal 45 abuts the circumferential groove 33 of the cylinder main body 15. In a state in which the primary piston 18 causes the annular groove 203 to be positioned on a side closer to the bottom portion 13 than the piston seal 45, the piston seal 45 can seal a space between the primary feeding channel 48 and the large-diameter pressure chamber 210. That is, the piston seal 45 can block communication of the large-diameter pressure chamber 210 with respect to the primary feeding channel 48 and the reservoir 12. In this sealing state, when the primary piston 18 slides in the inner circumferences of the intermediate sliding inner diameter portion 29, the piston seal 43, the opening side sliding inner diameter portion 40, the piston seal 45, and the seal 52 and moves toward the bottom portion 13, the brake fluid inside the large-diameter pressure chamber 210 is pressurized. In a state in which the hydraulic pressure inside the large-diameter pressure chamber 210 is higher than the hydraulic pressure in the primary pressure chamber 85, the brake fluid pressurized in the large-diameter pressure chamber 210 opens the piston seal 43 and is supplied from the large-diameter pressure chamber 210 to the primary pressure chamber 85.

When there is no input from the output shaft of the brake booster (not illustrated), and the primary piston 18 is at the basic position (non-braking position) where the ports 76 are open in the opening groove 47 as illustrated in FIG. 1, the piston seal 45 is at the position of the axis-direction grooves 204 of the primary piston 18 and overlaps the axis-direction grooves 204 in the cylinder axis direction. Then, when the primary piston 18 moves toward the bottom portion 13 of the cylinder main body 15, and the inner circumferential portion of the piston seal 45 overlaps a side of the primary piston 18 opposite to the axis-direction grooves 204 from the annular groove 203, communication between the large-diameter pressure chamber 210 and the reservoir 12 is blocked.

When there is no input from the brake booster (not illustrated), and the master cylinder 11 is in a basic state as illustrated in FIG. 1, the primary piston 18 and the secondary piston 19 are positioned at the basic positions (non-braking position). When the primary piston 18 is at this basic position, the ports 76 are positioned on a side closer to the large-diameter pressure chamber 210 than the piston seal 43 disposed in the circumferential groove 32, and the secondary pressure chamber 68 and the large-diameter pressure chamber 210 communicate with each other via the ports 76. In addition, when the primary piston 18 is at this basic position, the annular groove 203 is positioned on a side closer to the primary feeding channel 48 than the piston seal 45 disposed in the circumferential groove 33, and the large-diameter pressure chamber 210 and the primary feeding channel 48 communicate with each other via the annular groove 203 and the axis-direction grooves 204. When the secondary piston 19 is at this basic position, the ports 60 are positioned on a side closer to the opening groove 37 than the piston seal 35 disposed in the circumferential groove 30, and the secondary pressure chamber 68 and the secondary feeding channel 38 communicate with each other via the ports 60.

Then, when there is an input from the brake booster (not illustrated), and the primary piston 18 moves from the basic position toward the bottom portion 13, the primary piston 18 causes the annular groove 203 to be positioned on a side closer to the bottom portion 13 than the piston seal 45 and blocks communication between the large-diameter pressure chamber 210 and the primary feeding channel 48. In this case, the primary piston 18 causes the ports 76 to be positioned on a side closer to the bottom portion 13 than the piston seal 43 at the same time. Due to a rise of a hydraulic pressure in the large-diameter pressure chamber 210, the piston seal 43 is opened, and the brake fluid is supplied from the large-diameter pressure chamber 210 to the primary pressure chamber 85. As a result, due to the movement of the primary piston 18 toward the bottom portion 13, the hydraulic pressure inside the primary pressure chamber 85 increases, and the brake fluid inside the primary pressure chamber 85 is supplied from the primary discharging channel 27 to the braking cylinder on the wheel side. When the hydraulic pressure in the primary pressure chamber 85 becomes equal to or higher than the hydraulic pressure in the large-diameter pressure chamber 210, the piston seal 43 is closed, thereby being in a state in which communication between the primary pressure chamber 85 and the large-diameter pressure chamber 210 is blocked.

Due to the movement of the primary piston 18 toward the bottom portion 13, the secondary piston 19 is pressed via the interval adjustment portion 79 and moves from the basic position toward the bottom portion 13. Consequently, the piston seal 35 closes the ports 60 of the secondary piston 19 and seals the secondary pressure chamber 68 by blocking communication between the secondary pressure chamber 68 and the secondary feeding channel 38. As a result, due to the movement of the secondary piston 19 to the bottom portion 13 side, the hydraulic pressure inside the secondary pressure chamber 68 increases, and the brake fluid inside the secondary pressure chamber 68 is supplied from the secondary discharging channel 26 to the braking cylinder on the wheel side.

From a state in which the primary piston 18 and the secondary piston 19 have moved toward the bottom portion 13, when the brake pedal (not illustrated) starts to return in order to release braking, the secondary piston 19 tends to return to the basic position due to a biasing force of the secondary piston spring 62, and the primary piston 18 tends to return thereto due to a biasing force of the interval adjustment portion 79, respectively.

The capacity of the secondary pressure chamber 68 expands due to the movement of the secondary piston 19. In this case, if returning of the brake fluid via the brake piping cannot catch up the increase in the capacity of the secondary pressure chamber 68, the hydraulic pressure in the secondary feeding channel 38 (atmospheric pressure) and the hydraulic pressure in the secondary pressure chamber 68 become equal to each other. Thereafter, the hydraulic pressure inside the secondary pressure chamber 68 becomes a negative pressure, so that the hydraulic pressure in the secondary pressure chamber 68 becomes lower than the hydraulic pressure in the secondary feeding channel 38 (atmospheric pressure).

Consequently, the negative pressure inside this secondary pressure chamber 68 opens the piston seal 35, and the brake fluid is fed to the secondary pressure chamber 68 via the gap between the piston seal 35 and the circumferential groove 30. Accordingly, the speed of the hydraulic pressure in the secondary pressure chamber 68 returning from the negative pressure state to the atmospheric pressure is increased.

In addition, the capacities of the primary pressure chamber 85 and the large-diameter pressure chamber 210 expand due to the movement of the primary piston 18. In this case, when returning of the brake fluid via the brake piping cannot catch up the capacity increase in the capacities of the primary pressure chamber 85 and the large-diameter pressure chamber 210, the hydraulic pressure in the primary feeding channel 48 (atmospheric pressure) and the hydraulic pressures in the primary pressure chamber 85 and the large-diameter pressure chamber 210 become equal to each other. Thereafter, the hydraulic pressures inside the primary pressure chamber 85 and the large-diameter pressure chamber 210 become negative pressures, so that the hydraulic pressures in the primary pressure chamber 85 and the large-diameter pressure chamber 210 become lower than the hydraulic pressure in the primary feeding channel 48 (atmospheric pressure).

Consequently, the negative pressures inside the primary pressure chamber 85 and the large-diameter pressure chamber 210 open the piston seal 43 and the piston seal 45. As a result, the brake fluid of the primary feeding channel 48 is fed to the large-diameter pressure chamber 210 and the primary pressure chamber 85 via the gap between the piston seal 45 and the circumferential groove 33, and the gap between the piston seal 43 and the circumferential groove 32. Accordingly, the speed of the hydraulic pressure in the large-diameter pressure chamber 210 and the primary pressure chamber 85 returning from the negative pressure state to the atmospheric pressure is increased.

Figure 2:
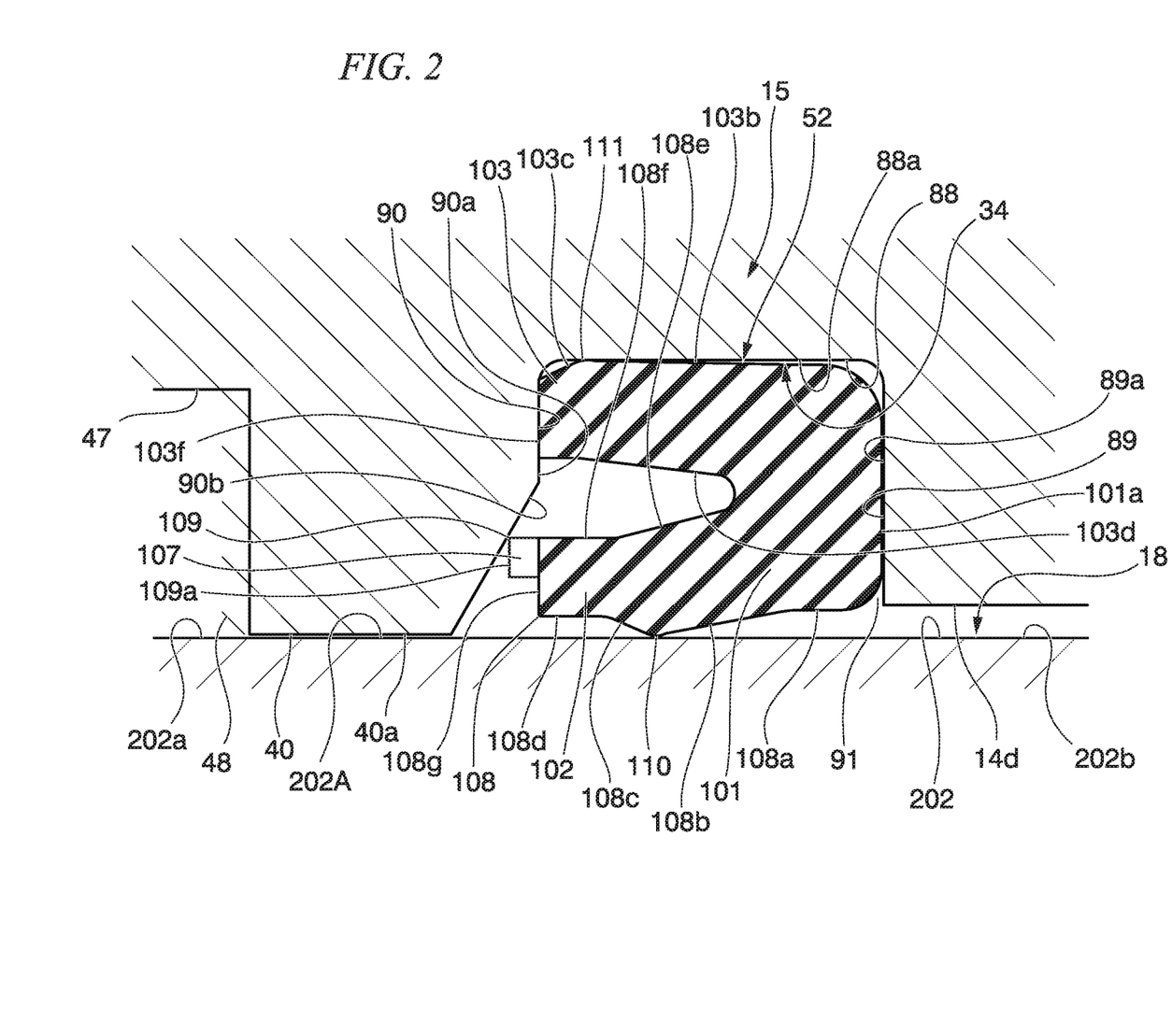
FIG. 2 is a cross-sectional view illustrating a main part of the master cylinder of the embodiment in a non-braking state.
Figure 3:
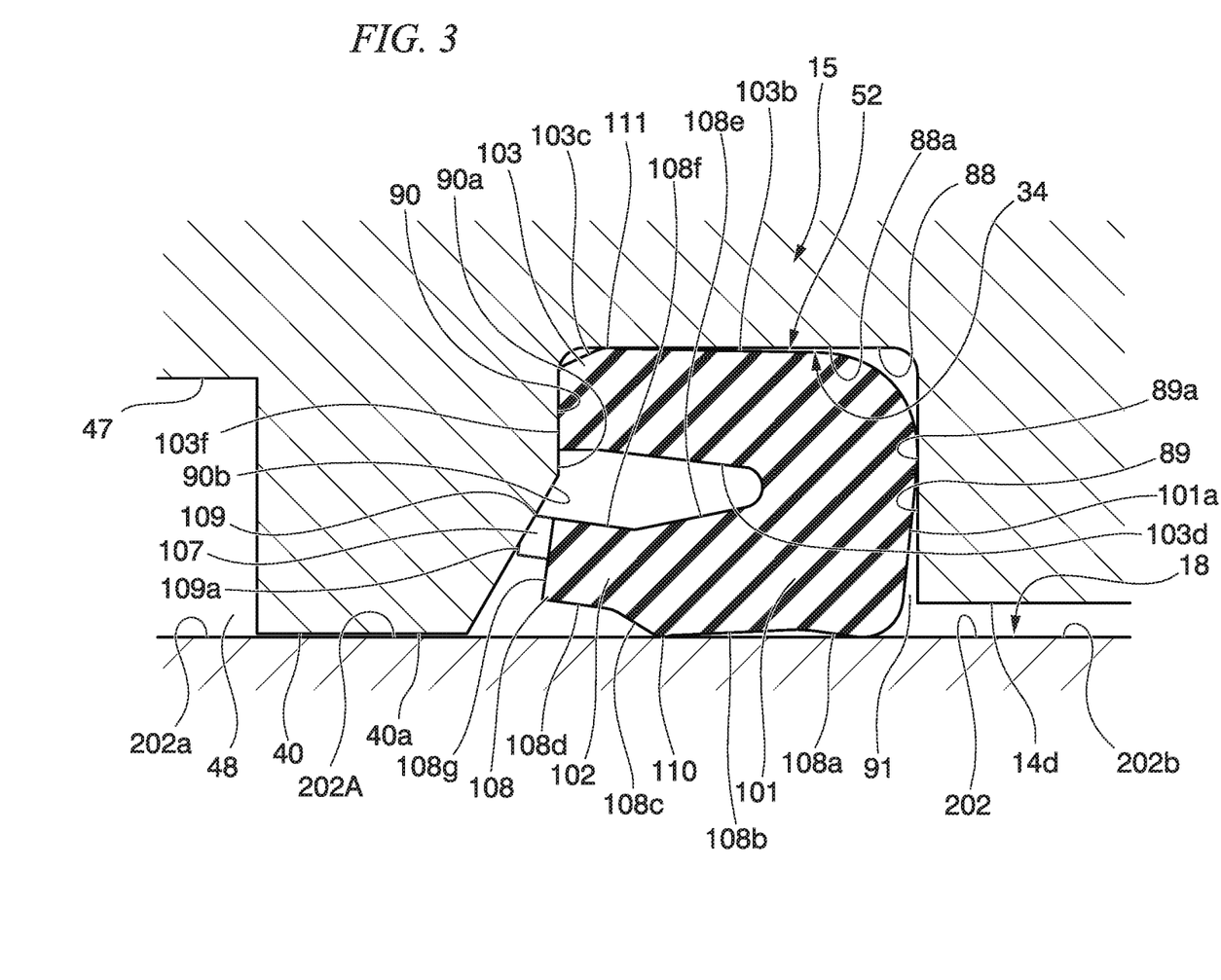
FIG. 3 is a cross-sectional view illustrating the main part of the master cylinder of the embodiment in a braking state.

The circumferential groove 34, of the circumferential grooves 30 to 34, disposed to be closest to the opening portion 16 has a groove bottom portion 88 which becomes the bottom portion of the circumferential groove 34, on the outer side in the cylinder radial direction as illustrated in FIGS. 2 and 3 (upper side in FIGS. 2 and 3). In addition, the circumferential groove 34 has a circumferential wall 89 extending inward in the cylinder radial direction from an end edge portion on the inner circumferential surface 14*d* side of the groove bottom portion 88 in the cylinder axis direction (the opening portion 16 side (atmosphere side) of the cylinder main body 15 illustrated in FIG. 1, and which will hereinafter be referred to as a cylinder opening side). Moreover, the circumferential groove 34 has a circumferential wall 90 extending inward in the cylinder radial direction from the end edge portion on the opening groove 47 side of the groove bottom portion 88 in the cylinder axis direction (the bottom portion 13 side (primary feeding channel 48 side) of the cylinder main body 15 illustrated in FIG. 1, and which will hereinafter be referred to as a cylinder bottom side). The groove bottom portion 88, the circumferential wall 89, and the circumferential wall 90 are formed in the cylinder main body 15 and are formed through cutting performed with respect to the cylinder main body 15. A side of the circumferential wall 89 and the circumferential wall 90 opposite to the groove bottom portion 88 forms a groove opening portion 91 which becomes an opening portion of the circumferential groove 34.

The groove bottom portion 88 has a groove bottom surface portion 88*a*. The groove bottom surface portion 88*a* is a cylinder surface having the cylinder axis as the center, and the length in the cylinder axis direction is uniform throughout the entire circumference in the cylinder circumferential direction.

The circumferential wall 89 of the circumferential groove 34 on the cylinder opening side has a wall surface portion 89*a*. The wall surface portion 89*a* extends inward in the cylinder radial direction from the cylinder opening side of the groove bottom portion 88. The wall surface portion 89*a* is configured of a flat surface orthogonal to the cylinder axis. The wall surface portion 89*a* has a uniform inner diameter and a uniform outer diameter, has a uniform width in the cylinder radial direction throughout the entire circumference in the cylinder circumferential direction, and is formed into a toric shape having the cylinder axis as the center. The end edge portion of the wall surface portion 89*a* on the large diameter side and the end edge portion of the groove bottom surface portion 88*a* on the cylinder opening side are connected to each other through round chamfering. An inner circumferential end edge portion of the wall surface portion 89*a* leads to the inner circumferential surface 14*d* of the cylinder main body 15, and the minimum inner diameter of the wall surface portion 89*a* is the same as the diameter of the inner circumferential surface 14*d*.

The circumferential wall 90 of the circumferential groove 34 on the cylinder bottom side faces the circumferential wall 89 in the cylinder axis direction and has an outer wall surface portion 90*a* and an inner inclined surface portion 90*b* (inclined surface portion). The outer wall surface portion 90*a* extends inward in the cylinder radial direction from the cylinder bottom side of the groove bottom portion 88.

The outer wall surface portion 90a is constituted of a flat surface orthogonal to the cylinder axis. The outer wall surface portion 90a has a uniform inner diameter and a uniform outer diameter, has a uniform width in the cylinder radial direction, and is formed into a toric shape having the cylinder axis as the center. The end edge portion of the outer wall surface portion 90a on the large diameter side and the end edge portion of the groove bottom surface portion 88a on the cylinder bottom side are connected to each other through round chamfering.

The inner inclined surface portion 90b obliquely extends inward in the cylinder radial direction from the inner end edge portion of the outer wall surface portion 90a in the cylinder radial direction with respect to the cylinder axis to be positioned closer to the cylinder bottom side toward the inner side in the cylinder radial direction. In other words, the inner inclined surface portion 90b is formed into a tapered shape and extends to be reduced in diameter from the inner end edge portion of the outer wall surface portion 90a in the cylinder radial direction to the cylinder bottom side toward the cylinder bottom side. In other words, the inner inclined surface portion 90b is formed to be narrower from the cylinder opening side toward the cylinder bottom side. Conversely, the inner inclined surface portion 90b is formed to be wider from the cylinder bottom side toward the cylinder opening side. In other words, the inner inclined surface portion 90b is formed in this groove opening side, that is, the circumferential wall 90 on the primary feeding channel 48 side such that the groove width in the piston axis direction increases from the groove bottom portion 88 toward the groove opening portion 91.

In the inner inclined surface portion 90b, each of the width in the cylinder radial direction and the length in the cylinder axis direction is uniform throughout the entire circumference in the cylinder circumferential direction and is formed into a tapered shape having the cylinder axis as the center. The inner circumferential end edge portion of the inner inclined surface portion 90b leads to the minimum inner diameter surface 40a of the opening side sliding inner diameter portion 40, and the minimum inner diameter of the inner inclined surface portion 90b is the same as the diameter of the minimum inner diameter surface 40a. The width of the inner inclined surface portion 90b in the cylinder radial direction is wider than the width of the outer wall surface portion 90a in the cylinder radial direction. An angle formed by the inner inclined surface portion 90b and the outer wall surface portion 90a is an obtuse angle.

In the circumferential groove 34, the maximum distance between the wall surface portion 89a and the inner inclined surface portion 90b in the piston axis direction, that is, the groove width in the piston axis direction is longer than the distance between the inner circumferential surface 14d of the cylinder main body 15 and the groove bottom surface portion 88a in the piston radial direction, that is, the groove depth in the piston radial direction. In the circumferential groove 34, the groove width in the piston axis direction is longer than the distance of the cylinder main body 15 between the minimum inner diameter surface 40a of the opening side sliding inner diameter portion 40 and the groove bottom surface portion 88a in the piston radial direction. In the circumferential groove 34, the distance between the wall surface portion 89a and the outer wall surface portion 90a in the piston axis direction, that is, the minimum width in the piston axis direction is also longer than the distance between the inner circumferential surface 14d of the cylinder main body 15 and the groove bottom surface portion 88a in the piston radial direction and is longer than the distance between the minimum inner diameter surface 40a of the opening side sliding inner diameter portion 40 and the groove bottom surface portion 88a in the piston radial direction.

The seal 52 disposed in the circumferential groove 34 has a base portion 101, an inner circumferential lip portion 102, and an outer circumferential lip portion 103. The base portion 101 is disposed on the cylinder opening side of the seal 52 in its central axis (which will hereinafter be referred to as a seal axis) direction and is formed into a toric shape which is a flat plate shape orthogonal to the seal axis and has the seal axis as the center.

The inner circumferential lip portion 102 is formed into a toric cylinder shape protruding from the inner circumferential end edge portion of the base portion 101 toward the cylinder bottom side along the cylinder axis direction. The outer circumferential lip portion 103 is formed into a toric cylinder shape protruding from an outer circumferential end edge portion of the base portion 101 toward the cylinder bottom side along the cylinder axis direction.

In the inner circumferential lip portion 102, the protruding amount from the base portion 101 in the cylinder axis direction, that is, the length in the piston axis direction is larger than the protruding amount from the base portion 101 of the outer circumferential lip portion 103, that is, the length in the piston axis direction.

At all times, in the seal 52, the inner circumferential lip portion 102 comes into sliding contact with the outer circumferential surface 202A including the foregoing maximum outer diameter surface 202a of the large outer diameter portion 202 of the primary piston 18 moving in the cylinder axis direction. Therefore, at all times, the seal 52 comes into sliding contact with the cylinder surface 202b, of the maximum outer diameter surface 202a, continuously formed throughout the entire circumference without a groove or a hole. In the seal 52, the outer circumferential lip portion 103 abuts the groove bottom surface portion 88a of the groove bottom portion 88 of the circumferential groove 34 of the cylinder main body 15. In other words, the seal 52 has the toric base portion 101 provided with the inner circumferential lip portion 102 coming into sliding contact with the outer circumferential surface 201A of the primary piston 18 and the outer circumferential lip portion 103 abutting the circumferential groove 34 of the cylinder main body 15 protruding therefrom.

Figure 4:
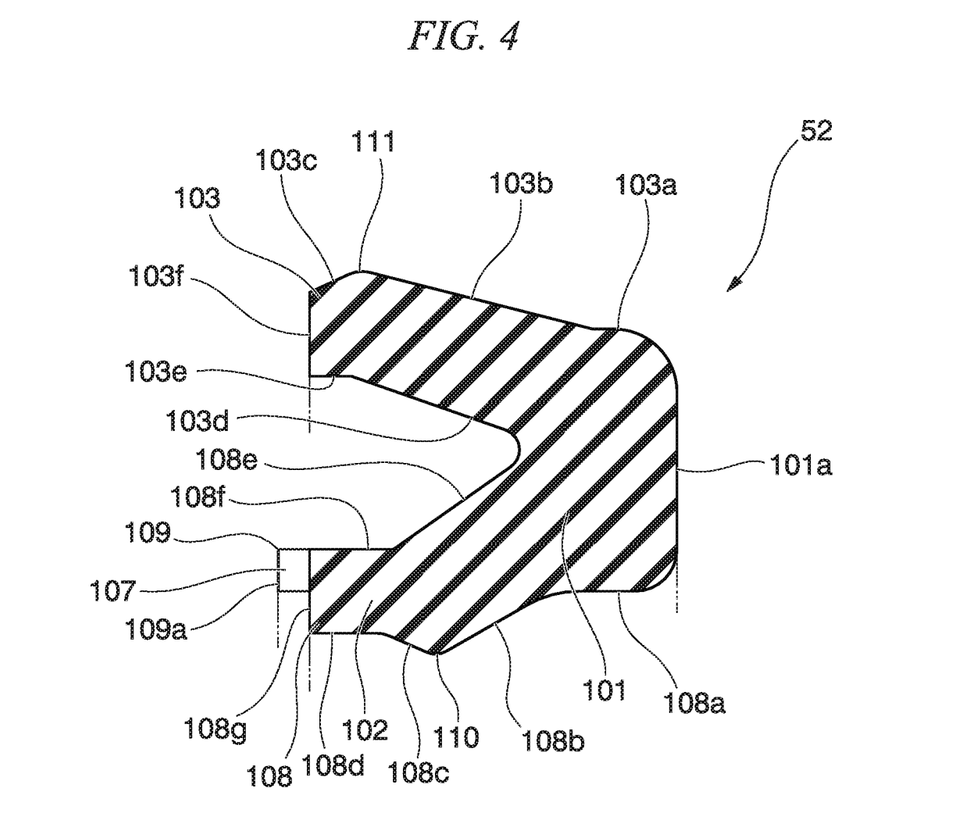
FIG. 4 is a cross-sectional view of a part illustrating a natural state before a seal of the master cylinder of the embodiment is assembled in the master cylinder.

With reference to FIG. 4, the seal 52 in a natural state before being assembled in the master cylinder 11 will be described. The central axes of the base portion 101, the inner circumferential lip portion 102, and the outer circumferential lip portion 103 coincide with each other, and the central axis becomes the central axis of the seal 52 (seal axis). Hereinafter, the circumferential direction of the seal 52 will be referred to as a seal circumferential direction, and the radial direction of the seal 52 will be referred to as a seal radial direction, respectively. In addition, the base portion 101 side in the seal axis direction will be described as the back side, and the protrusion side of the inner circumferential lip portion 102 and the outer circumferential lip portion 103 in the seal axis direction from the base portion 101 will be described as the front side.

The inner circumferential lip portion 102 is formed into a substantially tapered cylinder shape reduced in diameter as being away from the base portion 101, and the outer circumferential lip portion 103 is formed into a substantially tapered cylinder shape increased in diameter as being away from the base portion 101.

In the base portion 101, a rear surface 101a on the back side is a flat surface orthogonal to the seal axis. The base portion 101 has a uniform inner diameter and a uniform outer diameter, has a uniform width in the seal radial direction throughout the entire circumference in the seal circumferential direction, and is formed into a toric shape having the seal axis as the center.

In the inner circumferential lip portion 102, a plurality of inner lip grooves 107 penetrating the inner circumferential lip portion 102 in the seal radial direction are formed in the tip portion of its front side at equal intervals in the seal circumferential direction. Accordingly, the inner circumferential lip portion 102 has an inner circumferential lip portion main body 108 which is formed into a cylinder shape on the base portion 101 side, and protrusion portions 109 which protrude to the front side beyond the inner circumferential lip portion main body 108. A plurality of protrusion portions 109 are formed at equal intervals in the seal circumferential direction.

The inner circumferential lip portion main body 108 of the inner circumferential lip portion 102 and the inner side of the base portion 101 in the seal radial direction include a cylinder surface 108a which has a cylindrical shape, a tapered surface 108b which is reduced in diameter as being away from the cylinder surface 108a, a tapered surface 108c which is increased in diameter as being away from the tapered surface 108b, and a cylinder surface 108d which has a cylindrical shape, in order from the back side. The end edge portion of the cylinder surface 108a on the back side and the end edge portion of the rear surface 101a on the small diameter side are connected to each other through round chamfering. Since the tapered surface 108b and the tapered surface 108c are formed, the inner circumferential lip portion main body 108 has a shape including an inner projection portion 110 protruding inward in the seal radial direction. The inner projection portion 110 is formed throughout the entire circumference in the seal circumferential direction and has an annular shape.

In addition, the outer side of the inner circumferential lip portion main body 108 in the seal radial direction has a tapered surface 108e which is reduced in diameter toward the front side, and a cylinder surface 108f which has a cylindrical shape, in order from the back side. A tip surface 108g of the inner circumferential lip portion main body 108 on the front side is a flat surface orthogonal to the seal axis. The protrusion portions 109 protrudes from the end portion of this tip surface 108g on the outer side in the seal radial direction to the front side. A tip surface 109a of the protrusion portions 109 on the front side is also a flat surface orthogonal to the seal axis.

On the outer side in the seal radial direction, the outer circumferential lip portion 103 and the base portion 101 include a cylinder surface 103a which has a cylindrical shape, a tapered surface 103b which is increased in diameter as being away from the cylinder surface 103a, and a tapered surface 103c which is reduced in diameter as being away from the tapered surface 103b, in order from the back side. The end edge portion of the cylinder surface 103a on the back side and the end edge portion of the rear surface 101a on the large diameter side are connected to each other through round chamfering. Since the tapered surface 103b and the tapered surface 103c are formed, the outer circumferential lip portion 103 has a shape including an outer projection portion 111 protruding outward in the seal radial direction. The outer projection portion 111 is formed throughout the entire circumference in the seal circumferential direction and has an annular shape.

In addition, the inner side of the outer circumferential lip portion 103 in the seal radial direction has a tapered surface 103d which is increased in diameter toward the front side, and a cylinder surface 103e having a cylindrical shape, in order from the back side. A tip surface 103f of the outer circumferential lip portion 103 on the front side is a flat surface orthogonal to the seal axis and is disposed on the same flat surface as the tip surface 108g of the inner circumferential lip portion main body 108. The end edge portion of the tapered surface 103d on the back side and the end edge portion of the tapered surface 108e on the back side are connected to each other through round chamfering.

Next, with reference to FIG. 2, the seal 52 in a state of being assembled inside the master cylinder 11 will be described. FIG. 2 illustrates the basic state (non-braking state before the brake pedal is operated) of the master cylinder 11. When being in this basic state, in the seal 52, the inner circumferential lip portion 102 abuts the cylinder surface 202b of the large outer diameter portion 202 of the primary piston 18 in the inner projection portion 110, the outer circumferential lip portion 103 abuts the groove bottom surface portion 88a of the circumferential groove 34 in the outer projection portion 111, and the base portion 101 is in contact with the wall surface portion 89a of the circumferential wall 89 on the rear surface 101a. In this state, the central axis of the seal 52 coincide with the central axis of the primary piston 18. Accordingly, the seal axis becomes the piston axis, the seal radial direction becomes the piston radial direction, and the seal circumferential direction becomes the piston circumferential direction.

When the master cylinder 11 is in the basic state, in the seal 52, the distance between the tip surface 103f of the outer circumferential lip portion 103 and the rear surface 101a of the base portion 101 in the piston axis direction, that is, the length in the piston axis direction from the tip portion of the outer circumferential lip portion 103 to the end portion on a side of the base portion 101 opposite to the outer circumferential lip portion 103 is substantially equal to the distance between the wall surface portion 89a and the outer wall surface portion 90a of the circumferential groove 34 in the piston axis direction, that is, the groove width of the groove bottom portion 88 in the piston axis direction on the groove bottom side of the circumferential groove 34. The length in the piston axis direction from the tip portion of the outer circumferential lip portion 103 to the end portion of the base portion 101 on a side opposite to the outer circumferential lip portion 103 is slightly shorter than the width of the circumferential groove 34 on the groove bottom side in the piston axis direction by the insertion amount. Even in a natural state before the seal 52 is assembled in the master cylinder 11, this dimensional relationship is established.

When the master cylinder 11 is in the basic state, in the seal 52, the distance between the tip surface 109a of the inner circumferential lip portion 102 on the foremost side and the rear surface 101a of the base portion 101 in the piston axis direction, that is, the length in the piston axis direction from the tip portion of the inner circumferential lip portion 102 to the end portion of the base portion 101 on a side opposite to the inner circumferential lip portion 102 is longer than the distance between the wall surface portion 89a and the outer wall surface portion 90a of the circumferential groove 34 in the piston axis direction, that is, the groove width of the groove bottom portion 88 in the piston axis direction on the groove bottom side of the circumferential groove 34. Even in a natural state before the seal 52 is assembled in the master cylinder 11, this dimensional relationship is established. When the master cylinder 11 is in the basic state, in the seal 52, the largest diameter of the tip surface 109a on the foremost side of the inner circumferential lip portion 102 is smaller than the largest diameter of the inner inclined surface portion 90b of the circumferential groove 34, and the smallest diameter of the tip surface 109a is larger than the smallest diameter of the inner inclined surface portion 90b. As a result, in the seal 52, the protrusion portions 109, which are the tip portions of the inner circumferential lip portion 102, are positioned on a side closer to the inner inclined surface portion 90b than the outer wall surface portion 90a of the circumferential groove 34 in the piston axis direction and is disposed to face a place in the vicinity of the inner inclined surface portion 90b.

When there is an input from the output shaft of the brake booster (not illustrated), and the primary piston 18 moves from the basic position toward the cylinder bottom, in the seal 52, the inner circumferential lip portion 102 moves toward the cylinder bottom, that is, toward the circumferential wall 90 together with the primary piston 18 inside the circumferential groove 34. As a result, as illustrated in FIG. 3, in the seal 52, while the inner circumferential lip portion 102 slightly moves the base portion 101 inward in the piston radial direction having the inner projection portion 110 as the center, the protrusion portions 109 of the inner circumferential lip portion 102 abuts the inner inclined surface portion 90b of the circumferential wall 90. In this state, even if the primary piston 18 further moves toward the cylinder bottom, in the seal 52, the protrusion portions 109 abuts the inner inclined surface portion 90b. Therefore, displacement of the inner circumferential lip portion 102 more than thereof is regulated inside the circumferential groove 34. As a result, in the seal 52, rotation is unlikely to be generated in a direction in which the inner circumference side moves to the cylinder bottom side and a direction in which the outer circumference side moves to the cylinder opening side, so that the posture becomes stable.

That is, in the seal 52, when the primary piston 18 moves toward the cylinder bottom, in association with the movement of this primary piston 18, the inner circumferential portions of the inner circumferential lip portion 102 and the base portion 101 in the piston radial direction tend to move toward the circumferential wall 90 inside the circumferential groove 34. Consequently, since the movement range of the seal 52 is limited by the circumferential groove 34, a rotation moment is generated in a direction in which the inner circumference side moves to the cylinder bottom side and a direction in which the outer circumference side moves to the cylinder opening side. With respect to this rotation moment, the seal 52 withstands such that the inner circumferential lip portion 102 abuts the inner inclined surface portion 90b of the circumferential wall 90 so as not to rotate. Accordingly, the posture of the seal 52 becomes stable, so that the inner circumferential lip portion 102 is capable of stably coming into sliding contact with the primary piston 18 and the outer circumferential lip portion 103 is capable of stably abutting the groove bottom portion 88 of the circumferential groove 34.

The master cylinder disclosed in Patent Document 1 is provided with a piston seal which is disposed in a circumferential groove of a cylinder main body, comes into sliding contact with a piston, seals a gap thereof, and regulates leakage of the brake fluid to the outside air side. In such a piston seal, it is desired that seal efficiency be improved.

In the master cylinder 11 of the present embodiment, the seal 52 defining the primary feeding channel 48 in which the brake fluid is present inside thereof and the outside air side out of the cylinder main body 15 has the toric base portion 101 provided with the inner circumferential lip portion 102 coming into sliding contact with the outer circumferential surface 202A of the primary piston 18 and the outer circumferential lip portion 103 abutting the circumferential groove 34 of the cylinder main body 15 protruding therefrom. Then, the inner circumferential lip portion 102 has a length in a piston axis direction longer than the outer circumferential lip portion 103, and the circumferential groove 34 has a groove width in the piston axis direction larger than the groove depth in the piston radial direction. The inner inclined surface portion 90b is formed in the circumferential wall 90 on a groove opening side, that is, the primary feeding channel 48 side such that the groove width in the piston axis direction increases from the groove bottom portion 88 toward the groove opening portion 91.

Accordingly, even if a rotation moment is generated, the seal 52 withstands such that the inner circumferential lip portion 102 abuts the inner inclined surface portion 90b of the circumferential wall 90 so as not to rotate. As a result, the posture of the seal 52 becomes stable, so that the inner circumferential lip portion 102 is capable of stably coining into sliding contact with the primary piston 18 and the outer circumferential lip portion 103 is capable of stably abutting the groove bottom portion 88 of the circumferential groove 34. Therefore, seal efficiency can be improved by the seal 52.

In addition, in the seal 52, the length in the piston axis direction from the tip portion of the outer circumferential lip portion 103 to the end portion of the base portion 101 on a side opposite to the outer circumferential lip portion 103 is substantially equal to the groove width of the groove bottom portion 88 in the piston axis direction of the circumferential groove 34. Therefore, the length in the piston axis direction from the tip portion of the inner circumferential lip portion 102 longer than the outer circumferential lip portion 103 to the end portion of the base portion 101 on a side opposite to the inner circumferential lip portion 102 becomes longer than the groove width of the circumferential groove 34 on the groove bottom side in the piston axis direction. As a result, the tip portion of the inner circumferential lip portion 102 is disposed in the vicinity of the inner inclined surface portion 90b. Accordingly, even if a rotation moment is generated as described above, the seal 52 withstands such that the inner circumferential lip portion 102 reliably abuts the inner inclined surface portion 90b of the circumferential wall 90 so as not to rotate. As a result, the posture of the seal 52 becomes stable, so that the inner circumferential lip portion 102 is capable of more stably coming into sliding contact with the primary piston 18 and the outer circumferential lip portion 103 is capable of more stably abutting the groove bottom portion 88 of the circumferential groove 34. Therefore, seal efficiency can be further improved by the seal 52.

Figure 5:
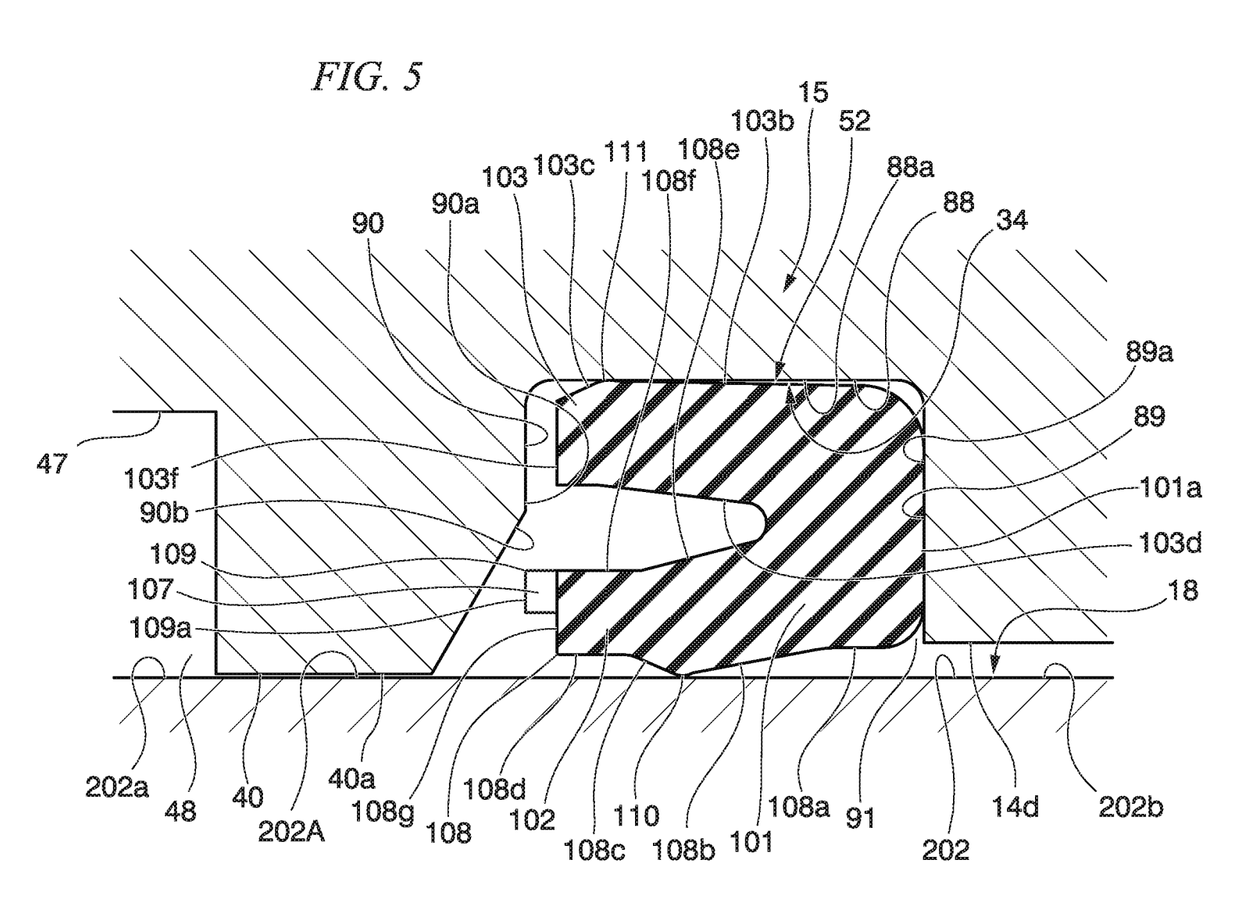
FIG. 5 is a cross-sectional view illustrating a main part of a master cylinder of a modified example of the embodiment in a non-braking state.
Figure 6:
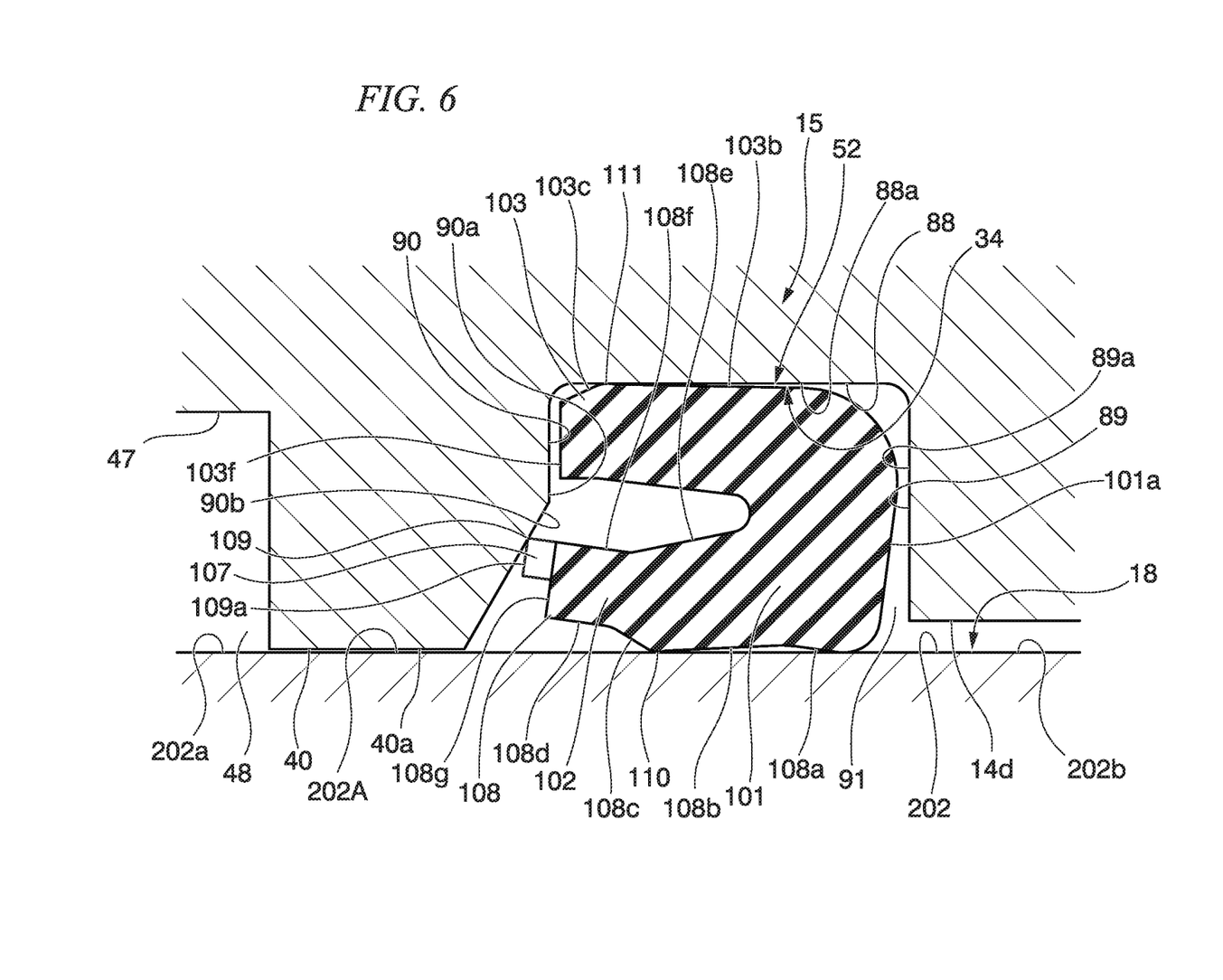
FIG. 6 is a cross-sectional view illustrating the main part of the master cylinder of the modified example of the embodiment in a braking state.

Here, as illustrated in FIG. 5, in the seal 52, the distance between the tip surface 109a of the inner circumferential lip portion 102 on the foremost side and the rear surface 101a of the base portion 101 in the piston axis direction, that is, the length in the piston axis direction from the tip portion of the inner circumferential lip portion 102 to the end portion of the base portion 101 on a side opposite to the inner circumferential lip portion 102 may be equal to the distance between the wall surface portion 89a and the outer wall surface portion 90a of the circumferential groove 34 in the piston axis direction, that is, the width of the circumferential groove 34 on the groove bottom side in the piston axis direction. In this case, in the seal 52, the distance between the tip surface 103f of the outer circumferential lip portion 103 and the rear surface 101a of the base portion 101 in the piston axis direction, that is, the length in the piston axis direction from the tip portion of the outer circumferential lip portion 103 to the end portion of the base portion 101 on a side opposite to the outer circumferential lip portion 103 is caused to be slightly shorter than the distance between the wall surface portion 89a and the outer wall surface portion 90a of the circumferential groove 34 in the piston axis direction, that is, the width of the circumferential groove 34 on the groove bottom side in the piston axis direction. Accordingly, when the primary piston 18 moves to the cylinder bottom side, the seal 52 moves together with the primary piston 18 and withstands such that the inner circumferential lip portion 102 abuts the inner inclined surface portion 90b of the circumferential wall 90 so as not to rotate.

The configuration of the embodiment described above can also be applied to other piston seals as long as the piston seal blocks circulation of a brake fluid at all times. For example, the configuration of the embodiment may be applied to the circumferential groove 31 and the piston seal 42 which seal the gap between the secondary piston 19 and the cylinder main body 15 at all times.

A first aspect of the embodiment described above includes a cylinder main body that has a bottomed cylinder shape including a discharging channel for a brake fluid and a feeding channel communicating with a reservoir, a piston that is movably provided inside the cylinder main body and forms a pressure chamber supplying a hydraulic pressure to the discharging channel between the piston and the cylinder main body, and a seal that is disposed inside a circumferential groove formed to be open on an inner circumferential surface of the cylinder main body, so that an inner circumference comes into sliding contact with the piston to define the feeding channel and an exterior of the cylinder main body. The seal has an inner circumferential lip portion which protrudes from a toric base portion and comes into sliding contact with an outer circumferential surface of the piston, and an outer circumferential lip portion which abuts the circumferential groove of the cylinder main body. The inner circumferential lip portion has a length in a piston axis direction longer than the outer circumferential lip portion. The circumferential groove has an inclined surface portion formed in a circumferential wall on the feeding channel side such that a groove width increases from a groove bottom portion toward a groove opening portion.

According to a second aspect, in the first aspect, a length of the seal in the piston axis direction from a tip portion of the outer circumferential lip portion to an end portion of the base portion on a side opposite to the outer circumferential lip portion is substantially equal to the groove width of the groove bottom portion of the circumferential groove.

According to a third aspect, in the first or second aspect, a length of the seal in the piston axis direction from a tip portion of the inner circumferential lip portion to an end portion of the base portion on a side opposite to the inner circumferential lip portion is larger than the groove width of the circumferential groove on a groove bottom side.

According to a fourth aspect, in the third aspect, the tip portion of the inner circumferential lip portion of the seal is disposed in the vicinity of the inclined surface portion.

According to a fifth aspect, in any of the first to fourth aspects, the groove width of the circumferential groove is larger than a groove depth.

INDUSTRIAL APPLICABILITY

According to the master cylinder described above, seal efficiency can be improved.

REFERENCE SIGNS LIST

11 Master cylinder
15 Cylinder main body
18 Primary piston (piston)
18A Outer circumferential surface
27 Primary discharging channel (discharging channel)
34 Circumferential groove
52 Seal
48 Primary feeding channel (feeding channel)
85 Primary pressure chamber (pressure chamber)
90 Circumferential wall
90b Inner inclined surface portion (inclined surface portion)
101 Base portion
102 Inner circumferential lip portion
103 Outer circumferential lip portion
210 Large-diameter pressure chamber (pressure chamber)

The invention claimed is:

1. A master cylinder comprising:
a cylinder main body that has a bottomed cylinder shape including a discharging channel for a brake fluid and a feeding channel communicating with a reservoir;
a piston that is movably provided inside the cylinder main body and forms a pressure chamber that supplies a hydraulic pressure to the discharging channel between the piston and the cylinder main body; and
a seal that is disposed inside a circumferential groove formed to be open on an inner circumferential surface of the cylinder main body, so that an inner circumference comes into sliding contact with the piston to define the feeding channel and an exterior of the cylinder main body,
wherein the seal has an inner circumferential lip portion which protrudes from a toric base portion and comes into sliding contact with an outer circumferential surface of the piston, and an outer circumferential lip portion which abuts the circumferential groove of the cylinder main body,
wherein the inner circumferential lip portion has a length in a piston axis direction longer than the outer circumferential lip portion,
wherein the circumferential groove has an inclined surface portion formed in a circumferential wall on the feeding channel side such that a groove width increases from a groove bottom portion toward a groove opening portion,
wherein the inclined surface portion is configured such that:
  i) in a non-braking state: a tip portion of the inner circumferential lip portion does not contact the inclined surface portion; and
  ii) in a braking state: the tip portion of the inner circumferential lip portion does contact the inclined surface portion, and
wherein, displacement of the inner circumferential lip portion upon braking is thereby regulated by the inclined surface portion contacting the tip portion of the inner circumferential lip portion.

2. The master cylinder according to claim 1,
wherein a length of the seal in the piston axis direction from a tip portion of the outer circumferential lip portion to an end portion of the base portion on a side opposite to the outer circumferential lip portion is substantially equal to the groove width of the groove bottom portion of the circumferential groove.

3. The master cylinder according to claim 1, wherein a length of the seal in the piston axis direction from a tip portion of the inner circumferential lip portion to an end portion of the base portion on a side opposite to the inner circumferential lip portion is larger than the groove width of the circumferential groove on a groove bottom side.

4. The master cylinder according to claim 3, wherein the tip portion of the inner circumferential lip portion of the seal is disposed in the vicinity of the inclined surface portion.

5. The master cylinder according to claim 1, wherein the groove width of the circumferential groove is larger than a groove depth.

6. A master cylinder comprising:
a cylinder main body that has a bottomed cylinder shape including a discharging channel for a brake fluid and a feeding channel communicating with a reservoir;
a piston that is movably provided inside the cylinder main body and forms a pressure chamber that supplies a hydraulic pressure to the discharging channel between the piston and the cylinder main body; and
a seal that is disposed inside a circumferential groove formed to be open on an inner circumferential surface of the cylinder main body, so that an inner circumference comes into sliding contact with the piston to define the feeding channel and an exterior of the cylinder main body,
wherein the circumferential groove has a bottom side circumferential wall that includes an outer wall surface portion and an inner inclined surface portion,
wherein the seal has an inner circumferential lip portion which protrudes from a toric base portion and comes into sliding contact with an outer circumferential surface of the piston, and an outer circumferential lip portion which abuts the circumferential groove of the cylinder main body,
wherein a protrusion portion is provided on a front side of the inner circumferential lip portion,
wherein the outer circumferential lip portion includes a first tip portion, and the protrusion portion includes a second tip portion,
wherein the inner circumferential lip portion has a length in a piston axis direction longer than the outer circumferential lip portion,
wherein the outer wall surface portion and the inner inclined surface portion are configured such that:
  i) in a non-braking state: only the first tip portion of the outer circumferential lip portion planarly contacts the outer wall surface portion, and
  ii) in a braking state: the first tip portion of the outer circumferential lip portion planarly contacts the outer wall surface portion and at the same time, the second tip portion of the protrusion portion planarly contacts the inner inclined surface portion, and
wherein, displacement of the inner circumferential lip portion upon braking is thereby regulated by the second tip portion of the protrusion portion planarly contacting the inner inclined surface portion.

7. The master cylinder according to claim 6, wherein a length of the seal in the piston axis direction from a tip portion of the outer circumferential lip portion to an end portion of the base portion on a side opposite to the outer circumferential lip portion is substantially equal to the groove width of the groove bottom portion of the circumferential groove.

8. The master cylinder according to claim 6, wherein a length of the seal in the piston axis direction from a tip portion of the inner circumferential lip portion to an end portion of the base portion on a side opposite to the inner circumferential lip portion is larger than the groove width of the circumferential groove on a groove bottom side.

9. The master cylinder according to claim 8, wherein the tip portion of the inner circumferential lip portion of the seal is disposed in the vicinity of the inclined surface portion.

10. The master cylinder according to claim 6, wherein the groove width of the circumferential groove is larger than a groove depth.

* * * * *